(12) United States Patent
Bojsen et al.

(10) Patent No.: US 8,556,690 B2
(45) Date of Patent: Oct. 15, 2013

(54) FEED BEATER DIRECTIONAL VANES AND SCRAPER VANES

(75) Inventors: Thomas Bojsen, Randers C (DK);
Jakob Sorensen, Randers S.O (DK);
Mikkel Baltser, Mariager (DK); Bjarne Rasmussen, Randers C (DK); Henning Sorensen, Randers (DK)

(73) Assignee: AGCO A/S, Randers (DK)

(*) Notice: Subject to any disclaimer, the term of this patent is extended or adjusted under 35 U.S.C. 154(b) by 0 days.

(21) Appl. No.: 13/143,683

(22) PCT Filed: Dec. 11, 2009

(86) PCT No.: PCT/EP2009/066915
§ 371 (c)(1),
(2), (4) Date: Oct. 26, 2011

(87) PCT Pub. No.: WO2010/086063
PCT Pub. Date: Aug. 5, 2010

(65) Prior Publication Data
US 2012/0100898 A1  Apr. 26, 2012

(30) Foreign Application Priority Data
Jan. 27, 2009  (GB) .................................. 0901310.3

(51) Int. Cl.
*A01F 12/10*  (2006.01)
(52) U.S. Cl.
USPC .................................. 460/70; 460/69; 460/68
(58) Field of Classification Search
USPC .................. 460/69, 70, 110, 108, 113, 68, 67
See application file for complete search history.

(56) References Cited

U.S. PATENT DOCUMENTS

| 3,828,793 | A | * | 8/1974 | Gochanour | 460/70 |
| 4,291,709 | A | * | 9/1981 | Weber et al. | 460/70 |
| 4,328,815 | A | * | 5/1982 | Rowland-Hill | 460/16 |
| 4,492,237 | A | * | 1/1985 | Pakosh | 460/81 |

(Continued)

FOREIGN PATENT DOCUMENTS

| DE | 3030475 | 3/1981 |
| DE | 3030475 A1 | 3/1981 |

(Continued)

OTHER PUBLICATIONS

International Search Report from Application No. PCT/EP2009/066915 Dated Mar. 31, 2010.

(Continued)

*Primary Examiner* — Árpád Fábián-Kovács

(57) ABSTRACT

A combine harvester (10) comprising a pair of axial separating rotors (20) each extending side-by-side within respective housings (19) in a longitudinal direction and serving to separate grain from straw. A feed beater (18) is provided which rotates on a transverse axis (X) and is located in front of the separating rotors to direct a crop flow rearwardly under the feed beater. Directional vanes (34) on the feed beater direct the crop flow away from a central zone of the beater and toward respective crop streams associated with the two rotors. Scraper apparatus (50) comprising stationary vanes (54) are provided above the beater. Crop material which back feeds over the top of the beater is scraped free of the beater and directed outwardly by the stationary vanes so that the scraped material is re-fed under the beater away from the central zone.

12 Claims, 5 Drawing Sheets

(56) References Cited

U.S. PATENT DOCUMENTS

| | | | |
|---|---|---|---|
| 4,611,605 A * | 9/1986 | Hall et al. | 460/80 |
| 4,739,773 A * | 4/1988 | West et al. | 460/16 |
| 4,875,891 A * | 10/1989 | Turner et al. | 460/110 |
| 5,078,646 A * | 1/1992 | Claas et al. | 460/69 |
| 5,083,977 A * | 1/1992 | Coers | 460/71 |
| 5,334,093 A * | 8/1994 | Jensen et al. | 460/83 |
| 5,342,239 A * | 8/1994 | West et al. | 460/69 |
| 5,344,367 A * | 9/1994 | Gerber | 460/68 |
| 5,445,563 A * | 8/1995 | Stickler et al. | 460/69 |
| 5,688,170 A * | 11/1997 | Pfeiffer et al. | 460/69 |
| 6,129,629 A * | 10/2000 | Dammann et al. | 460/67 |
| 6,152,820 A * | 11/2000 | Heidjann et al. | 460/112 |
| 6,257,977 B1 * | 7/2001 | Moriarty | 460/68 |
| 7,070,498 B2 * | 7/2006 | Grywacheski et al. | 460/68 |
| 7,462,101 B2 * | 12/2008 | Grywacheski et al. | 460/68 |
| 8,109,815 B2 * | 2/2012 | Hollatz | 460/70 |

FOREIGN PATENT DOCUMENTS

| | | |
|---|---|---|
| EP | 0230276 | 7/1987 |
| EP | 0591688 | 4/1994 |
| GB | 2102664 | 2/1983 |
| GB | 2163635 | 3/1986 |
| GB | 2163635 A | 3/1986 |

OTHER PUBLICATIONS

UK Search Report for Application No. GB901310.3 dated May 8, 2009.

* cited by examiner

FEED BEATER DIRECTIONAL VANES AND SCRAPER VANES

BACKGROUND OF THE INVENTION

This invention relates to combine harvesters and in particular to such harvesters (hereinafter referred to as being of the kind described) which have twin axial separating rotors and a transverse feed beater under which a crop stream is conveyed before entering rotor housings for processing by the rotors, flights being provided on the feed beater which tend to move the crop passing under the beater axially outwardly from a central zone of the beater into the two rotors.

There are two main types of separating apparatus used within combine harvesters to separate grain from the straw with which it grows. In traditional combines used mainly in Europe, the threshed crop material is separated by means of a plurality of longitudinally-extending straw walkers which oscillate so as to 'walk' the straw to the rear of the combine whilst allowing the grain to drop through sieves formed in the base thereof. This technology is well established and has been acceptable for many decades.

More recently, with the increase in throughput demands on the combine, straw walkers have been replaced with longitudinally-extending separating rotors which each rotate around a longitudinal axis. In this arrangement, often referred to as 'axial', the crop stream is fed into the forward end of the separating rotor (or rotors) and is conveyed around the rotors within housing units in a rearwardly extending corkscrew path. Under the same basic principal as for the straw walkers, the straw is conveyed to the rear of the combine and the separated grain falls through holes in the rotor housing.

Axial combines have been employed in the United States, for example, for many years where the typical crop yield per unit area is significantly lower than that in Europe. In this case, however, the axial rotors also serve to thresh the grain from the straw. In European applications where the crop yield is more substantial, and typically of a greater moisture content, a transverse threshing drum often precedes the separating rotors, thereby giving an arrangement which is commonly known as 'hybrid' separation.

So as to maximise throughput of a hybrid combine, twin axial separating rotors, which extend side by side within respective housings, are adopted. It is well recognised that the mechanism by which the crop flow is conveyed from the transverse threshing drum to the twin rotor housings is a significant factor on the power consumption of the machine. As a result there is much effort to improve the transfer of the crop into the separating rotors.

In order to split a single crop stream presented to the separating rotors, a preceding feed beater which rotates on a transverse axis is known to comprise directional vanes which direct the crop flow away from a central zone of the beater and toward respective crop streams associated with the two rotors. However, it has been found that the directional vanes of the feed beater lead to increased back-feeding of the crop stream around a central part of the feed beater. This problem is particularly apparent for bulky and/or moisture-laden crops. Once wrapped around the feed beater, the effectiveness of the directional vanes decreases to an extent where further crop material accumulates around the central part, eventually leading to jamming of the entire threshing apparatus. Once jammed, the operator must undergo the time-consuming task of manually dislodging the wrapped material.

BRIEF SUMMARY OF THE INVENTION

It is therefore an object of the present invention to provide an improved harvester of the kind described which is resistant to problems of jamming of the beater due to crop wrapping around the beater.

According to the present invention there is provided a combine harvester comprising a pair of axial separating rotors each extending side-by-side within respective housings in a longitudinal direction and serving to separate grain from straw, a feed beater which rotates on a transverse axis and is located in front of the separating rotors to direct a crop flow rearwardly under the feed beater, the feed beater comprising directional vanes which direct the crop flow away from a central zone of the beater and toward respective crop streams associated with the two rotors, and scraper apparatus comprising stationary vanes provided above the beater, wherein crop material which back feeds over the top of the beater is scraped free of the beater and directed outwardly by the stationary vanes so that the scraped material is re-fed under the beater away from the central zone. The stationary vanes strip back fed material from the beater structure and guides it away from the middle, towards the left and right. Therefore, a problematic build up of material around the centre does not occur. Advantageously, this reduces the downtime of the machine which accompanies jamming caused by excessive back feeding.

It is recognised by the inventors that despite efforts to reduce the quantity of crop material that is back fed over the top of the beater, moisture-laden bulky crops will always lead to a percentage of back feeding. Apparatus in accordance with the invention inhibits the build up of this material thus allowing the directional vanes on the crop beater to function as intended.

The stationary vanes are preferably positioned above said transverse axis so as to interact with only material that is back fed around the top of the beater. Furthermore the stationary vanes are preferably positioned rearward from said transverse axis so as to interact immediately with back fed material as soon as it fails to engage with the respective separating rotor on the first pass.

Preferably the stationary vanes conform with the swept profile of the beater wherein the space in between the stationary vanes and directional vanes is substantially constant along the effective length of the stationary vanes. Advantageously, by maintaining a substantially constant separation, the scraping action of the spaced vanes is effective over their entire co-acting area.

In a preferred arrangement, the stationary vanes diverge from a longitudinal central plane in the direction of rotation of the feed beater. Therefore, the deflection away from the centre of the engaged crop material is increased, thereby reducing the probability of the deflected material feeding back after the second pass.

The stationary vanes preferably protrude at an angle of between 10 and 20 degrees to the radius of the feed beater away from a longitudinal central plane. Advantageously, this improves the scraping action by the stationary vanes in a similar manner to a knife peeling an apple.

The scraper apparatus may comprise a transverse element which connects the stationary vanes together, thereby increasing the strength of the unit. The scraper apparatus may also comprise a plate element which is fixed around the radially outside edges of the stationary vanes to inhibit back fed crop material wrapping around the stationary vanes. Advantageously, such a plate element also increases the strength and durability of the apparatus.

Preferably the scraper apparatus is detachably mounted as a single module. Advantageously, this allows an existing combine to be fitted with the inventive feature without substantial modification. For example, the single module may be mounted to a common transverse support member fixed across openings of both rotor housing and which serves to hold respective forward bearings of the two separating rotors.

Alternatively, the stationary vanes may be secured to the inside surface of a housing which at least partly surrounds the feed beater.

The invention is particularly advantageous for a hybrid type combine comprising a transverse threshing drum upstream of the feed beater. However, it will be appreciated that scraper apparatus in accordance with the invention may be employed on conventional axial combines.

BRIEF DESCRIPTION OF THE DRAWINGS

One embodiment of the present invention will now be described, by way of example with reference to the accompanying drawings in which.

DETAILED DESCRIPTION OF THE INVENTION

Figure 1:
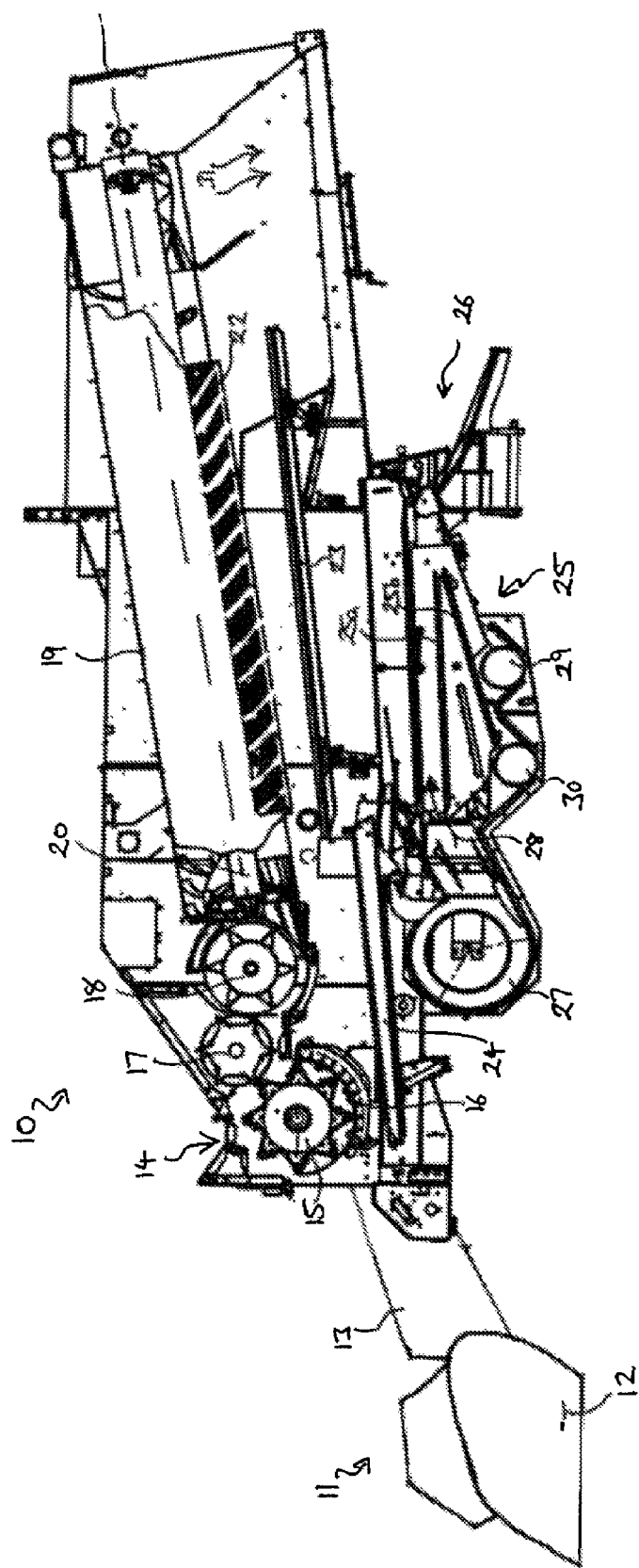
FIG. 1 shows a partial vertical section through a twin rotor combine in accordance with the present invention which has been simplified for clarity.
Figure 2:
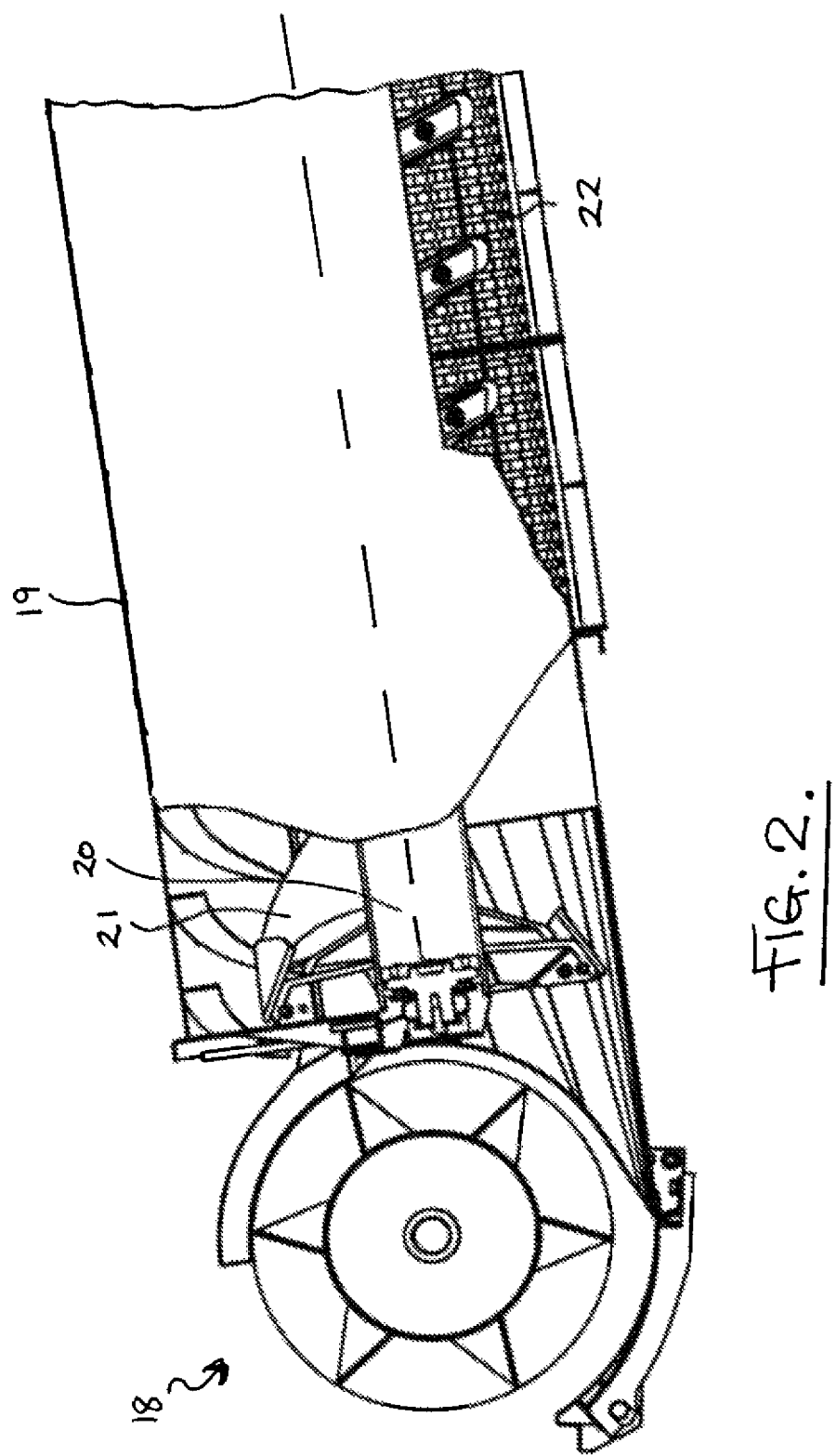
FIG. 2 shows part of the front end of one of the rotors of the combine of FIG. 1 on a larger scale.

With reference to FIG. 1, a combine harvester 10 comprises a header 11 detachably mounted at the front end thereof. The header 11 includes a cutter mechanism 12 and a feed mechanism having an enclosed elevator 13 which feeds harvested crop material into a transverse threshing drum 14. The threshing drum 14 comprises a rotating threshing cylinder 15 and a concave 16. Within the drum 14 the crop material is threshed by the cylinder 15 and a proportion of the separated grain falls through a grill in the concave 16. The remaining crop material is conveyed in a stream by the rotating motion of the cylinder 15, exiting the rear of the drum 14, and transferred rearwardly by a transfer beater 17 to a feed beater 18.

The crop material passes under the feed beater 18 and is transferred into respective housings 19 of axial separating rotors 20, each extending side-by-side in a longitudinal direction. Once divided, the separate crop streams are conveyed rearwardly, and in a corkscrew motion, through the respective rotor housings 19. Each rotor 20 comprises helical flights 21 which rotate and convey the crop streams as described.

The lower portion 22 of rotor housing 19 includes a series of gratings through which separated grain, chaff and smaller straw portions fall on to a oscillating grain pan 23 which transports this material forward causing it to cascade from the front end of the pan 23 into a cleaning mechanism.

The material which is conveyed forwardly by the oscillating grain pan 23 joins the separated grain which has fallen through the concave 16 and has been conveyed rearwardly by front grain pan 24. The grain/chaff mixture drops down into the cleaning mechanism, often referred to as a 'cleaning shoe', designated generally at 25. The cleaning shoe 25 comprises known technology and the mechanism of which will not be described in detail. In summary, the cleaning shoe comprises a pair of reciprocating sieves 25a,25b which allow the grain to pass through whilst conveying the chaff rearwardly, discharging it from the rear of the machine, designated generally at 26. A fan mechanism 27 forces air through the cleaning shoe in the direction of arrow 28 thereby driving the relatively light chaff and straw away from the sieves 25a,25b and out of the rear 26. The separated and cleaned grain is conveyed to the grain tanks (not shown) by a transverse auger 29. Material which passes through the relatively course sieve 25a but does not pass through the finer sieve 25b is collected by auger 30 and conveyed to a re-threshing mechanism (not shown) which serves to extract any remaining grain.

Turning back to the separating rotors 20, the straw which is conveyed in the separate crop streams to the rear of the rotor housings 19 is discharged at the rear of the machine 31.

Figure 3:
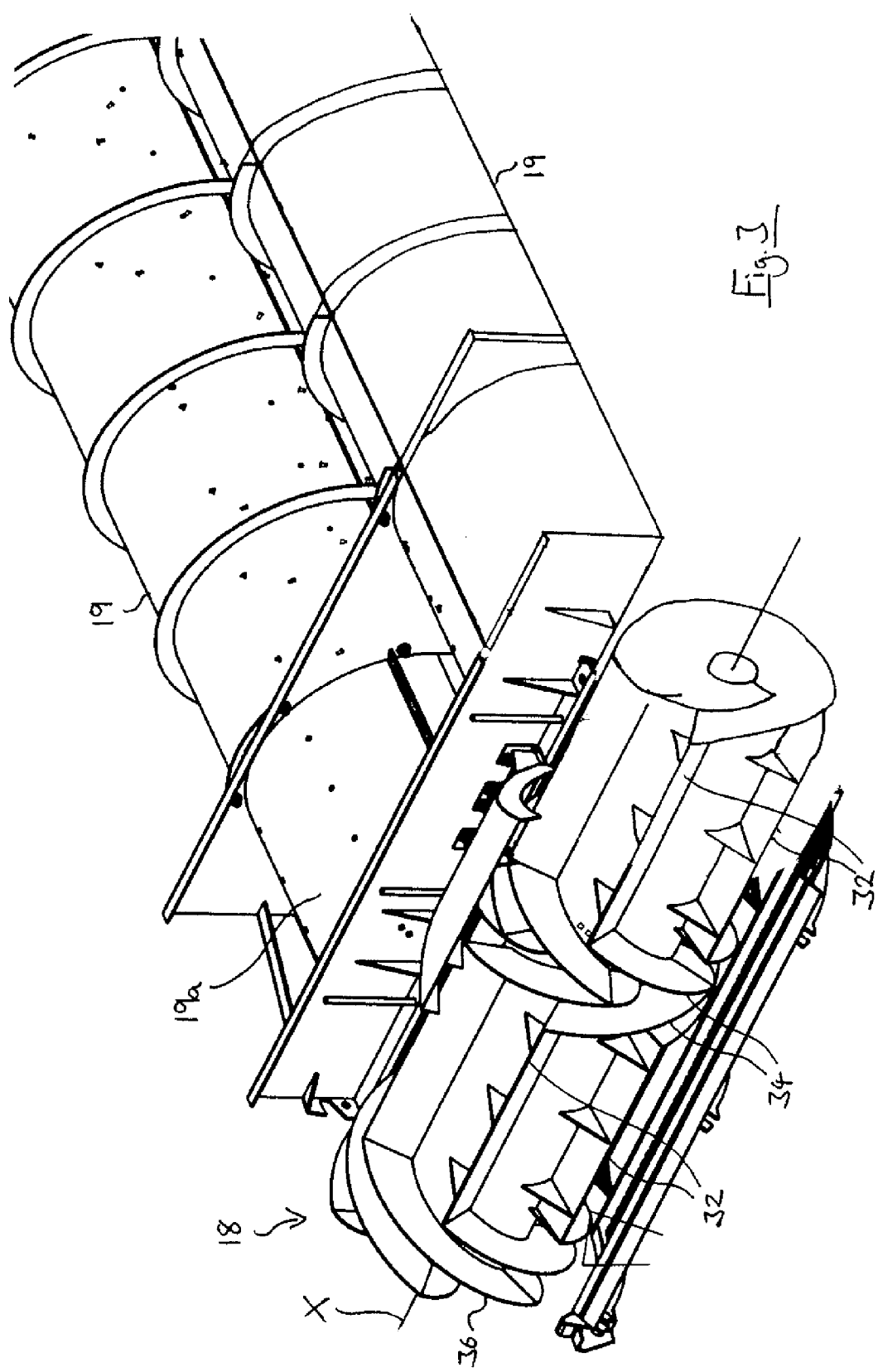
FIG. 3 shows a perspective view of the beater and scraper vanes of the present invention.

The present invention concerns the operation of the feed beater 18 and the successful division of the incoming crop stream into respective crop streams conveyed into each respective rotor housing 19. With particular reference to FIG. 3, the feed beater 18 rotates on axis X in a top forward direction. Upon the feed beater 18 there is disposed transversely extending vanes 32 and directional vanes 34, the latter being located around a central part of the beater 18. Furthermore, directional vanes 36 are provided on the end regions on the outside of the beater 18.

Figure 4:
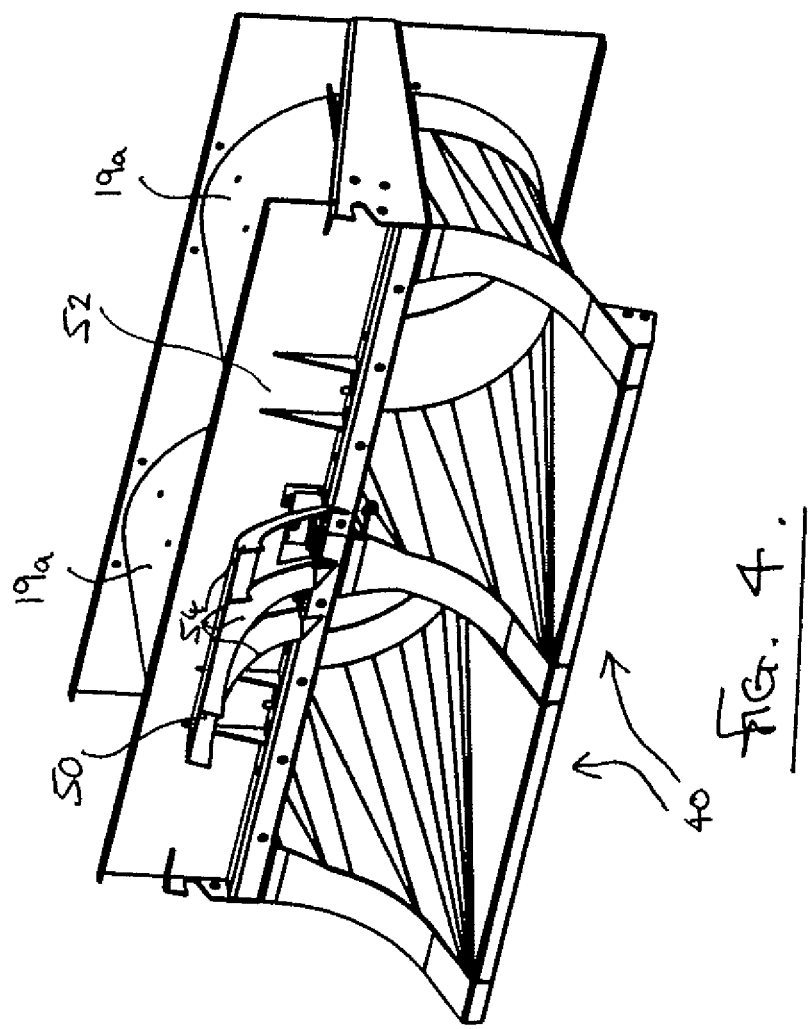
FIG. 4 shows a perspective view of the tapering infeed zone of the two rotors and the scraper vanes with the beater removed for clarity.

The crop stream which is conveyed by transfer beater 17 takes the form of a single crop mat which passes under the feed beater 18. The directional vanes 34 serve to direct the crop flow away from a central zone of the beater 18 and toward respective crop streams associated with the two rotors 20, thereby effectively dividing the single crop mat into two. Such division aids efficient conveyance of the crop flow into respective transfer housings 19a positioned at the front of the rotor housings 19, thereby reducing power consumption. The division of the crop stream is represented by arrows 40 shown in FIG. 4.

Figure 5:
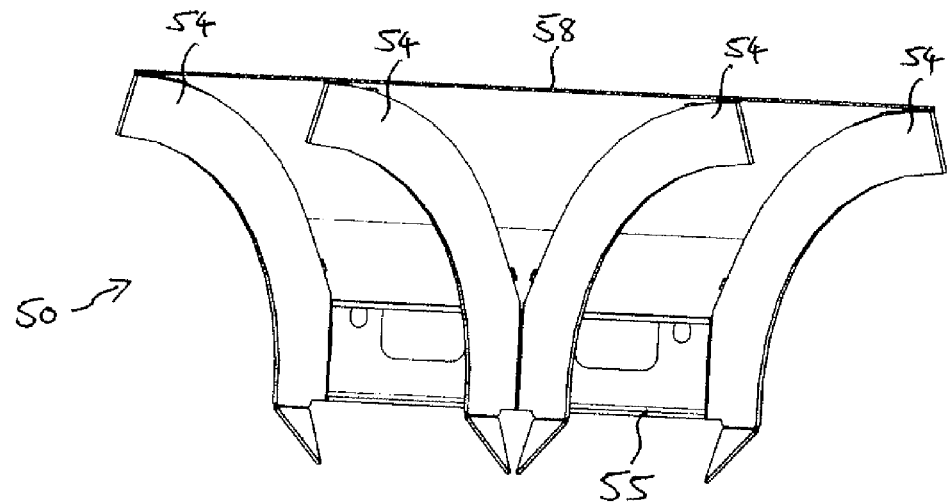
FIG. 5 shows an elevational front-on view of a scraper vane unit in accordance with the present invention in more detail.
Figure 6:
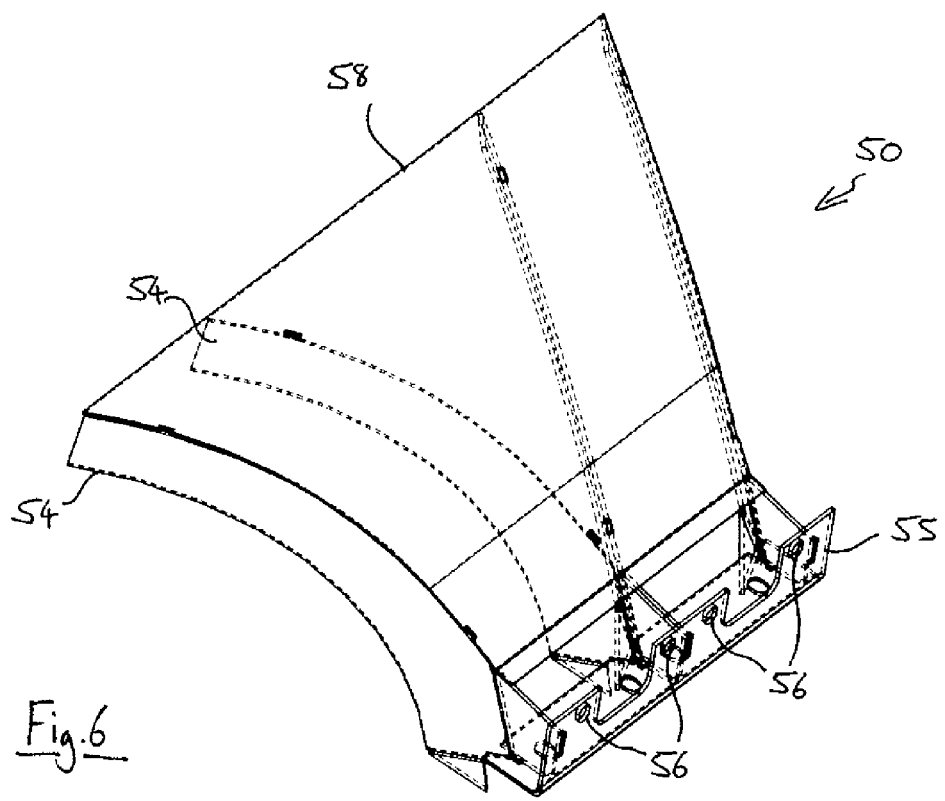
FIG. 6 shows a perspective view of the scraper vane unit of FIG. 5.

In accordance with the invention a scraper module 50 is bolted to a transverse support member 52 which extends across the front openings of the transition housings 19a and serves to support the front end of the rotating rotors 20. With reference to FIGS. 5 and 6, the scraper module 50 comprises four stationary vanes 54 each formed of strips of mild steel having a width of around 20 mm. The stationary vanes 54 are connected together by a transverse element 55 which is formed of angled steel plate. Holes 56 formed in the transverse element 55 are employed to bolt the module 50 to the transverse support 52. A plate element 58 is welded to the outside edge of the vanes 54 and conforms with the profile thereof.

It has been found that a percentage of the crop stream fails to enter the transition housings 19a on the first pass under the beater 18 and back-feeds over the top. This is particularly evident around the central zone which corresponds to the (central) directional vanes 34. Furthermore, crop material formed of long straw and/or of a high moisture content is particularly susceptible to this problem. Once wrapped around the beater the direction vanes 34 become less effective causing a greater build up of back-fed material. The scraper module 50 in accordance with the invention serves to scrape the back-fed material from a central zone of the beater 18 whilst also directing the scraped material outwardly from the central zone.

The scraper module 50 is positioned above the rotation axis X of beater 18 so as to interact with only the crop material which is back-fed. Therefore, no extra resistance is exerted on the large proportion of the crop stream which enters the transition housings 19a on the first pass, thereby minimizing any increase in power consumption.

Furthermore, the scraper module 50 is positioned rearward of the rotating axis X of the feed beater 18. This enables easy access to the front part of the feed beater 18 from above for maintenance reasons. Therefore, the scraper module 50 and corresponding stationary vanes 54 wrap around the rear upper quadrant of the feed beater 18, and in the central zone only. The stationary vanes 54 conform with the swept profile of the feed beater 18 in as much as the spacing between the stationary vanes 54 and directional vanes 34 is substantially constant along the effective length of the co-acting area. In this example the separation is 8 mm but it will be appreciated that this can be varied to adjust the severity of the scraping action.

With reference to FIG. 5, the stationary vanes 54 diverge from a longitudinal central plane, referenced generally by P, in the direction of rotation of the feed beater 18. This increases the relative angle between the stationary vanes and the direction vanes 34, thereby increasing the effectiveness of the scraping action between the co-acting edges.

The stationary vanes 54 also protrude from the plate element 58 at an angle of 15° to the radius of the feed beater 18 away from the longitudinal central plane P. This also serves to increase the effectiveness of the scraping action by the stationary vanes 54.

Therefore, any material which back-feeds in the central zone, corresponding approximately to the width of the direction vanes 34, is scraped from the feed beater 18 and directed outwardly towards the stationary vanes 32. This directional action increases the probability that the scraped material will join the separate crop streams upon the second pass under the feed beater 18 and thus enter the transition housings 19a successfully. The reduction in build-up of the back-fed material around the central region of the feed beater 18 avoids the risk of jamming and the associated down time required to remove the blockage.

In addition to improving the structural integrity of the scraper module 50, the plate elements 58 eliminates the interaction of the back-fed material with the outside edges of the stationary vanes 54 thereby avoiding the material also wrapping around the module 50.

As will be appreciated, the scraper module 50 can be simply attached and detached to the conventional apparatus as required thereby minimizing any changes to the existing structure. However, it should also be appreciated the stationary vanes in accordance with the invention can be integrated onto the inside edge of the feed beater housing (not shown) whilst still benefiting from the advantages of the invention.

Although the invention is described in relation to a hybrid type combine it will be appreciated that the scraper apparatus in accordance with the invention can be applied to a conventional axial combine (without a transverse threshing drum) without deviating from the scope of the invention.

From reading the present disclosure, other modification will be apparent to persons skilled in the art. Such modifications may involve other features which are already known in the field of combines and component parts therefore and which may be used instead of or in addition to features already described herein.

The invention claimed is:

1. A combine harvester comprising:
   a transverse threshing drum which rotates on a transverse axis and which conveys crop material rearwardly in a generally longitudinal direction in an arcuate path from an inlet to an outlet;
   a feed beater arranged downstream of the threshing drum and which rotates on an axis parallel to said transverse axis of the threshing drum;
   a pair of axial separating rotors each extending side-by-side within respective housings in a longitudinal direction and serving to separate grain from straw, and,
   scraper apparatus;
   wherein the feed beater is located in front of the separating rotors to direct a crop flow rearwardly under the feed beater, the feed beater comprising directional vanes which direct the crop flow away from a central zone of the beater and toward respective crop streams associated with the two rotors, the scraper apparatus comprising stationary vanes provided above the beater, wherein crop material which back feeds over the top of the beater is scraped free of the beater and directed outwardly by the stationary vanes so that the scraped material is re-fed under the beater away from the central zone.

2. A combine harvester according to claim 1, wherein the stationary vanes are positioned above said transverse axis.

3. A combine harvester according to claim 2, wherein the stationary vanes are positioned rearward from said transverse axis.

4. A combine harvester according to claim 1, wherein the spacing between the stationary vanes and directional vanes is substantially constant along the effective length of the stationary vanes.

5. A combine harvester according to claim 4, wherein the stationary vanes are spaced from the swept profile of the beater by less than 10 mm.

6. A combine harvester according to claim 1, wherein the stationary vanes diverge from a longitudinal central plane in the direction of rotation of the feed beater.

7. A combine harvester according to claim 1, wherein the stationary vanes protrude at an angle of between 10 and 20 degrees to the radius of the feed beater away from a longitudinal central plane.

8. A combine harvester according to claim 1, wherein the scraper apparatus comprises a transverse element which connects the stationary vanes together.

9. A combine harvester according to claim 1, wherein the scraper apparatus comprises a plate element which is fixed around the radially outside edges of the stationary vanes to inhibit back-fed crop material wrapping around the stationary vanes.

10. A combine harvester according to claim 8, wherein the scraper apparatus are detachably mounted as a single module.

11. A combine harvester according to claim 10, wherein the two separating rotors are supported on respective forward bearings which are secured to a common transverse support member fixed across openings of both rotor housings, the module being mounted to the transverse support member.

12. A combine harvester according to claim 1, further comprising a beater housing which at least partly surrounds the feed beater, wherein the stationary vanes are secured to the inside surface of the beater housing.

* * * * *